US012055044B1

(12) United States Patent
Sanzari

(10) Patent No.: US 12,055,044 B1
(45) Date of Patent: Aug. 6, 2024

(54) UNDERCUT GROOVE AND CHAMFER FOR RIM SEAL

(71) Applicant: Pratt & Whitney Canada Corp., Longueuil (CA)

(72) Inventor: Lorenzo Sanzari, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/482,458

(22) Filed: Oct. 6, 2023

(51) Int. Cl.
*F01D 11/00* (2006.01)

(52) U.S. Cl.
CPC ........ *F01D 11/006* (2013.01); *F05D 2220/32* (2013.01); *F05D 2240/55* (2013.01)

(58) Field of Classification Search
CPC . F01D 11/006; F05D 2220/32; F05D 2240/55
See application file for complete search history.

(56) References Cited

U.S. PATENT DOCUMENTS

| | | | |
|---|---|---|---|
| 7,465,152 B2 | 12/2008 | Nigmatulin | |
| 8,038,399 B1 | 10/2011 | Liang | |
| 8,277,177 B2 | 10/2012 | Liang | |
| 9,360,216 B2 * | 6/2016 | Hase | F01D 5/143 |
| 10,132,182 B2 * | 11/2018 | Aggarwala | F01D 11/005 |
| 10,633,992 B2 | 4/2020 | Synnott et al. | |
| 10,648,353 B2 | 5/2020 | Aggarwala et al. | |
| 2023/0175410 A1 | 6/2023 | Kim et al. | |

* cited by examiner

*Primary Examiner* — Brandon D Lee
(74) *Attorney, Agent, or Firm* — Kinney & Lange, P. A.

(57) ABSTRACT

A rim seal arrangement for a gas turbine engine includes a rotor and a stator. The rotor includes blades circumferentially spaced about a disc hub, each blade including a rotor flange. The stator includes vanes circumferentially spaced and attached to a stationary component, each vane including a stator flange. The stator flange includes an outer surface, an inner surface, a chamfer, and a groove for producing a recirculation flow adjacent to a radial gap between the rotor flange and the stator flange.

12 Claims, 3 Drawing Sheets

UNDERCUT GROOVE AND CHAMFER FOR RIM SEAL

BACKGROUND

The present disclosure relates generally to rim seals for gas turbine engines, and more particularly, to flow restrictors for improving rim seal performance.

In order to produce work and/or thrust, gas turbine engines use one or more compressor stages to pressurize airflow received at an inlet, add heat energy to the pressurized airflow through combustion, and expand the heated and pressurized airflow across one or more turbine stages. During operation, gas turbine efficiency can be negatively affected by leakage of the compressed airflow. Moreover, leakage of the airflow can increase the temperature of gas turbine engine components, which may decrease operational life of one or more gas turbine engine components. Rim seals are used to reduce leakage between rotors and stators during operation of the gas turbine engine.

SUMMARY

A rim seal arrangement according to an example of this disclosure includes a rotor and a stator. The rotor includes a rotor disc and a plurality of blades mounted to the rotor disc. Each blade includes a rotor platform mounted to the rotor disc and a rotor airfoil extending radially from the rotor platform. The rotor platform extends beyond the rotor disc to define a rotor flange. The stator includes a plurality of vanes mounted to a stationary component of the gas turbine engine. Each vane includes a stationary airfoil and an inner stator platform. Each inner stator platform extends towards the rotor to form a stator flange. The stator flange includes an outer surface radially spaced from the rotor flange, an end face spaced from the rotor disc, a chamfer bridging the outer surface to the end surface, and a groove. The groove includes a base surface offset from the outer surface, a downstream surface joining a gas path surface of the inner stator platform to the base surface, and an upstream surface extending radially to join the base surface to the outer surface.

DETAILED DESCRIPTION

Figure 1:
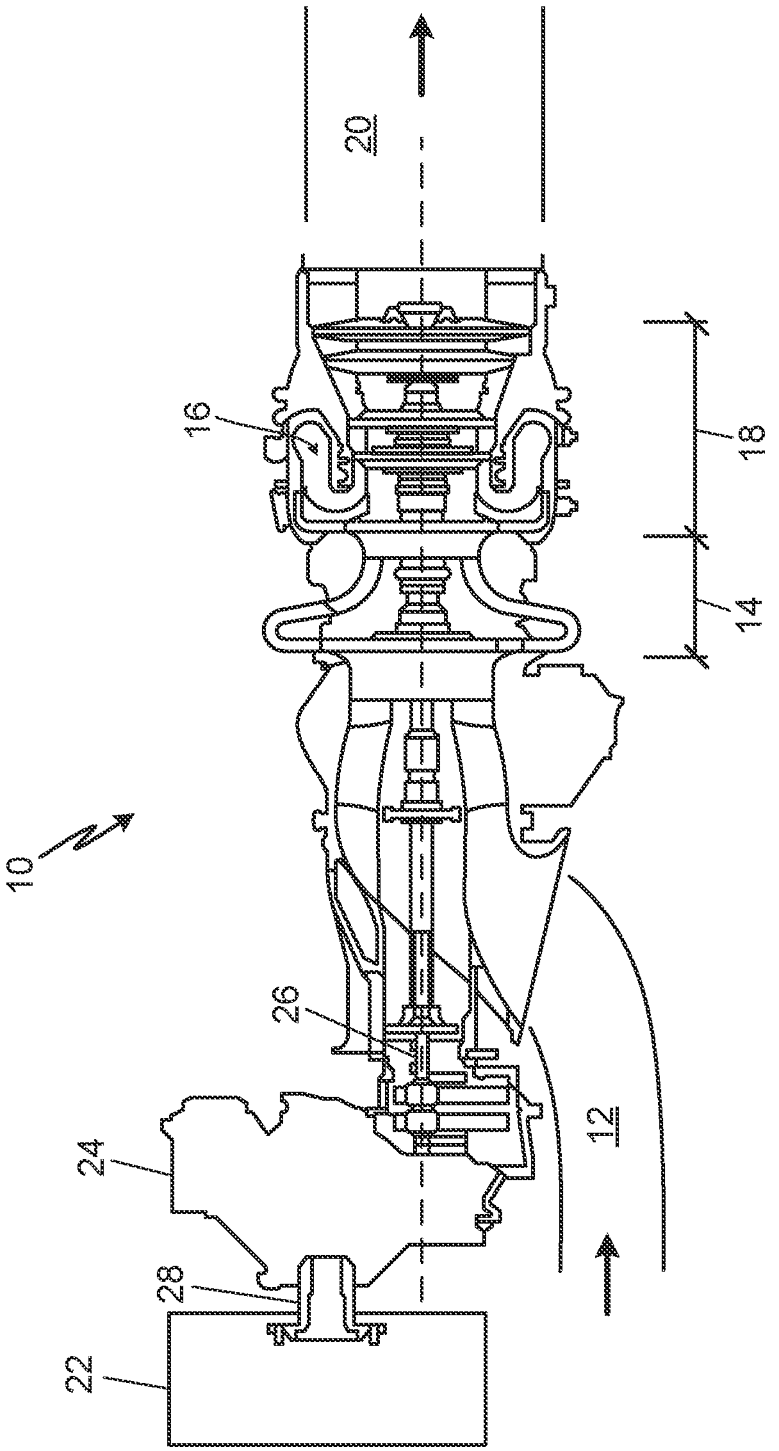
FIG. 1 is a schematic view of an example gas turbine engine cross section.

FIG. 1 is a schematic cross-sectional view of gas turbine engine 10, which is depicted as a turboprop engine. In other examples, gas turbine engine 10 can be a turboshaft engine, a turbofan engine, an industrial gas turbine engine, or any other turbomachine. The architecture of gas turbine engine 10 depicts a forward-to-aft main gas flow path in which the engine ingests air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. Other examples of gas turbine engine 10 can have more stages or less stages than the number of compressor stages and/or turbine stages depicted by FIG. 1.

As depicted in FIG. 1, gas turbine engine 10 includes, in serial flow communication, air inlet 12, compressor section 14, combustor 16, turbine section 18, and exhaust section 20. Compressor section 14 pressurizes air entering gas turbine engine 10 through air inlet 12. The pressurized air discharged from compressor section 14 mixes with fuel inside combustor 16. Igniters initiate combustion of the air-fuel mixture within combustor 16, which is sustained by a continuous supply of fuel and pressurized air. A heated and compressed air stream discharges through turbine section 10 and exhaust section 20. Turbine section 18 extracts energy from exhaust stream to drive compressor section 14 and other engine accessories such electrical generators and pumps for lubrication, fuel, and/or actuators.

Gas turbine engine 10 includes propeller 22, reduction gearbox 24, input shaft 26, and output shaft 28 for propelling an aircraft. Energy extracted by turbine section 18 drives input shaft 26, which is connected to an input of reduction gearbox 24. Reduction gearbox 24 drives output shaft 28 at a reduced speed proportional to a rotational speed of input shaft 26. Propeller 22 is rotationally coupled to output shaft 28, which drives propeller 22 during operation of gas turbine engine 10.

Compressor section 14 and turbine section 18 each include one or more stages, each stage including at least one row of circumferentially spaced stationary vanes paired with at least one row of circumferentially spaced rotor blades. Compressor section 14 and turbine section 18 can include multiple compressor sections 14 and/or multiple turbine sections 18, each compressor section 14 connected to at least one corresponding turbine section 18 via a shaft. For instance, gas turbine engine 10 can include a low-pressure compressor, a high-pressure compressor, a high-pressure turbine, and a low-pressure turbine. The high-pressure compressor, high-pressure turbine, and high-pressure shaft form a high-pressure spool and the low-pressure compressor, low-pressure turbine, and low-pressure shaft form a low-pressure spool. The high-pressure spool is arranged concentrically with low-pressure spool. In such examples, air entering air inlet 12 flows through, in series communication, the low-pressure compressor and the high-pressure compressor of compressor section 14, combustor 16, the high-pressure and low-pressure turbines of turbine section 18 before discharging from exhaust section 20. In other examples, turbine section 18 can include a power turbine or free turbine which is not rotationally coupled to a compressor section 14 but is rotationally coupled to a propulsor such as propeller 22.

Figure 2:
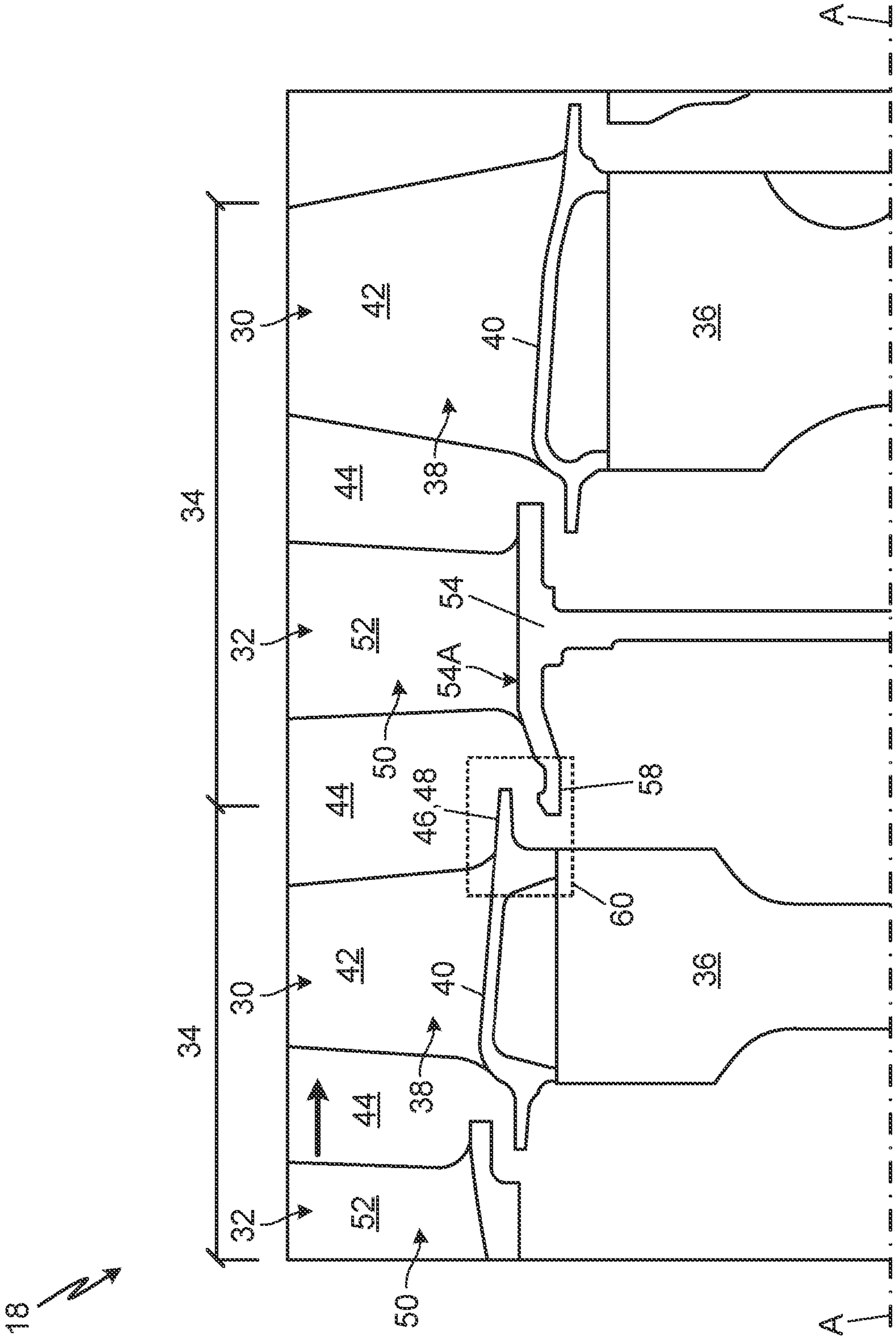
FIG. 2 is a schematic view of an example turbine section of the gas turbine engine.

FIG. 2 is a schematic cross-section of turbine section 18. As shown, turbine section 18 includes rotors 30, stators 32, each rotor-stator pair defining stage 34. Each rotor 30 includes rotor disc 36 and blades 38. Rotor disc 36 is adapted to rotate about longitudinal axis A mounted to a shaft for driving compressor section 14 and/or propeller 22. Blades 38 are mounted to disc 36 and are circumferentially spaced about rotor disc 36. Each blade 38 includes platform 40 and rotor airfoil 42, which extend radially outward relative to longitudinal axis A into main gas path 44 of gas turbine engine 10. Rotor platforms 40 extend axially beyond rotor disc 36 to form respective rotor flanges 46. Rotor flanges 46 extend axially toward respective stators 32 and extend circumferentially about axis A. Collectively, rotor flanges 46 form rotor rim 48, which extends circumferentially about longitudinal axis A.

Each stator 32 includes a circumferentially spaced array of vanes 50, each vane 50 mounted to a stationary component of gas turbine engine 10. Vanes 50 include stator airfoils 52 and inner stator platforms 54. Stator airfoils 52 extend radially outward from respective inner stator platforms 54. Each inner stator platform 54 includes gas path surface 54A, which bounds an annular section of main gas path 44. Inner stator platforms 54 include respective stator flanges 58, which extend toward an axially adjacent rotor 30. In some examples, each vane 50 can include an outer stator platform. Stator airfoils 52 of vanes 50 equipped with outer stator platforms extend from inner stator platform 54 to outer stator platform. In each of the foregoing configurations, and other variants thereof, gas turbine engine 10 can include one or more rim seals 60 formed by rotor flange 46 and stator flange 58.

Figure 3B:
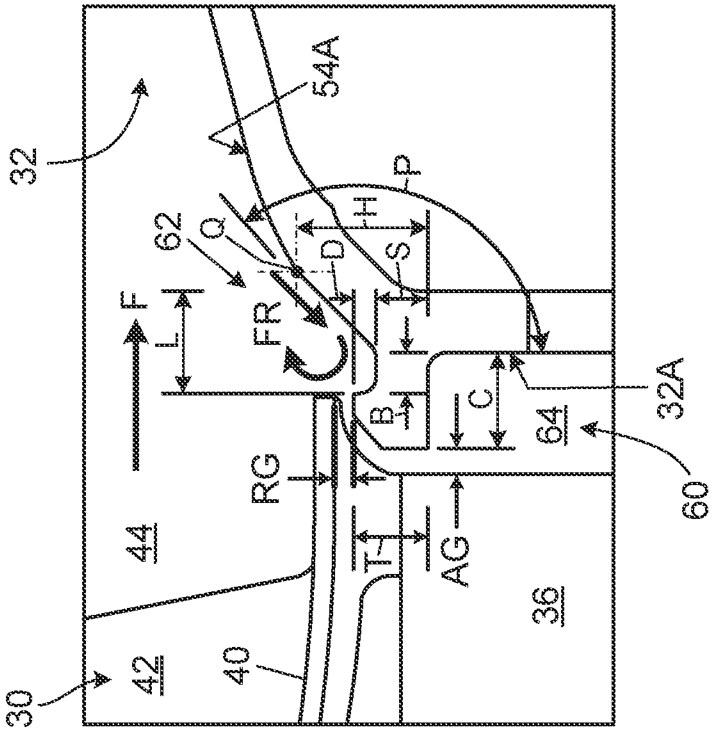
FIG. 3B is an enlarged view of the rim seal of FIG. 3A shown in a hot state of the gas turbine engine.
Figure 3A:
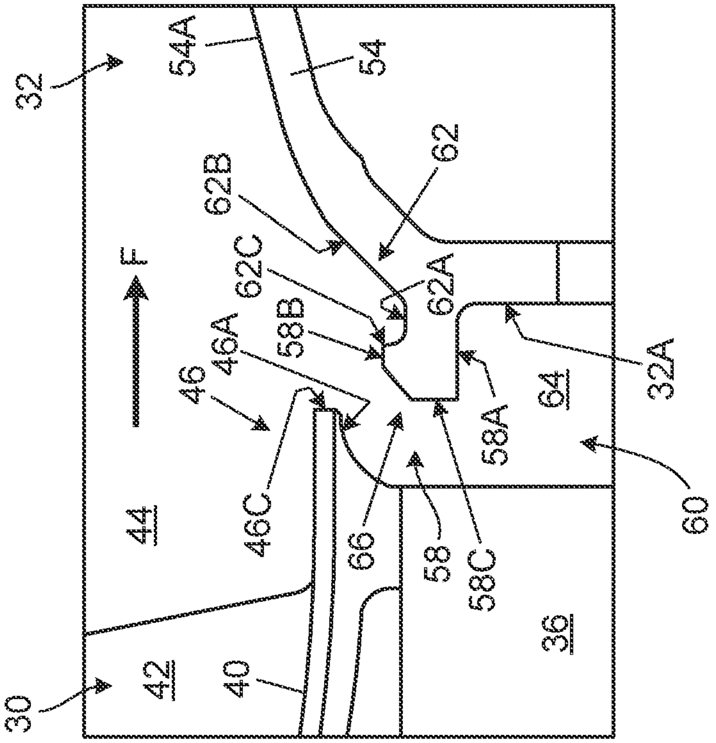
FIG. 3A is an enlarged view of a rim seal equipped with a flow restrictor groove, the rim seal shown in a cold state of the gas turbine engine.

FIG. 3A and FIG. 3B are enlarged views of an example rim seal 60. FIG. 3A depicts rim seal 60 in a cold state of gas turbine engine 10. FIG. 3B depicts rim seal in a hot state of gas turbine engine 10. FIG. 3A and FIG. 3B are discussed together below.

Rim seal 60 includes stator flange 58, rotor flange 46, and groove 62. Stator flange 58 is an annular body extending from stator 32 towards rotor 30, which is disposed radially inward from rotor flange 46. Rotor flange 46 and stator flange 58 form rim seal 60 to restrict leakage of the main gas flow from entering cavity 64, which is bound by axially adjacent rotor 30 and stator 32. Stator flange 58 includes inner surface 58A, outer surface 58B, and end surface 58C. Each of inner surface 58A and outer surface 58B can be a cylindrical surface concentric with longitudinal axis A. A radial distance between inner surface 58A and outer surface 58B defines a radial thickness T of stator flange 58. End face 58C may join inner surface 58A and outer surface 58B at a distal end of stator flange 58. Stator flange 58 extends from end face 32A of stator 32 towards rotor 30 by a distance C.

Stator flange 58, rotor flange 46, and disc 36 define gaps of rim seal 60. A radial distance between inner surface 46A of rotor flange 46 and outer surface 58B of stator flange 58 defines radial gap RG. An axial distance between disc 36 and end face 58C of stator flange 58 defines axial gap AG.

In some examples, stator flange 58 includes chamfer 66, which joins outer surface 58A to end face 58C. Chamfer 66 provides additional clearance between stator 32 and rotor 30 in a hot condition by reducing potential for rotor-stator interference near a junction of disc 36 and rotor platform 40. Some examples of rotor and stator, rotor junction and stator flange geometry limit minimum achievable radial gap RG and axial gap AG. Accordingly, incorporation of chamfer 66 permits reduced radial gap RG and axial gap AG in examples with limiting junction geometry. As radial gap RG and/or axial gap AG decreases, the leakage through radial gap RG and axial gap AG decreases, increasing the efficiency of rim seal 60.

Groove 62 is a recess formed within stator flange 58 and forms a transition between inner surface platform 54 and stator flange 58. As viewed in a longitudinal cross-section through stator 32, groove 62 includes an axisymmetric profile, which extends circumferentially about longitudinal axis A. One or more surfaces of groove 62 define the axisymmetric profile. For example, groove 62 can include base surface 62A, downstream surface 62B, and upstream surface 62C as depicted in FIG. 3A and FIG. 3B.

Base surface 62A is a surface that is offset radially inward from outer surface 58B of stator flange 58. In the depicted example, base surface 62A is a cylindrical surface that is concentric with longitudinal axis A. Base surface 62A is disposed entirely within stator flange 58 as shown. In other examples, base surface 62A can extend beyond stator flange into a body of stator 32.

Downstream surface 62B is downstream from base surface 62A relative to a main gas flow direction F and joins gas path surface 54A of inner stator platform 54 to base surface 62A of groove 62. Since stator flange 58 and groove 62 are radially inward from rotor flange 46, downstream surface 62B extends radially inward from gas path surface 54A from inner stator platform 54 to groove 62 (i.e., in an upstream direction). Downstream surface 62B can be a frustoconical surface such that a tangent to downstream surface 62 forms an oblique angle with longitudinal axis A when viewed in a longitudinal cross-section. In other examples, downstream surface 62B can be contoured, its profile defined by a surface with a variable slope in the axial direction.

Upstream surface 62C is upstream from base surface 62A and joins base surface 62A to outer surface 58B of stator flange 58. In the example depicted by FIG. 3A and FIG. 3B, upstream surface 62A is normal to longitudinal axis A and faces axially downstream in the direction of flow within main gas path 44.

The axisymmetric profile of groove 62 can include one or more radii R between downstream surface 62B and base surface 62A and/or between base surface 62A and upstream surface 62C. When present, radius R defines a smooth transition between downstream surface 62B, or upstream surface 62C, and base surface 62A such that surfaces 62A-C are tangent to radius R.

Groove 62 can be described by groove length L, groove height H, groove depth D, flange section S, base length B, and surface angle P. Groove length L is the axial distance between upstream surface 62C and a downstream-most point Q of downstream surface 62B. Point Q delimits the location along gas path surface 54A at which groove 62 deviates in a radial direction relative to axis A. In some examples, point Q can be a location of slope discontinuity along gas path surface 54A. In other examples, point Q can be a location along gas path surface 54A at which groove 62 deviates from a theoretical gas path flow line in the hot state. Groove height H is the radial distance between inner surface 58A of stator flange 58 and point Q. Groove length L and groove height H can be maximized within the mechanical and aerodynamic limits of stator 32 to maximize recirculation flow FR. Groove depth D is the radial distance between outer surface 58B of stator flange 58 and base surface 62A. In some examples, groove depth D can be at least three tenths of the radial thickness of stator flange 58 measured between outer surface 58B and inner surface 58A. Further, groove depth D can be no more than half the radial thickness of stator flange 58. Flange section S is the radial distance between base surface 62A and inner surface 58A. Groove depth D can be maximized to the extent permitted by stress within flange section S in order to maximize an effect of recirculation flow FR. Base length B is the axial distance between upstream surface 62C and end face 32A of stator 32. In some examples, base length B is at least one third of groove length L and no more than one half of groove length L. Surface angle P is the angle measured between an upstream face of stator 32 and downstream surface 62B in a radial plane intersecting axis A and stator 32 as shown in FIG. 3B. In some examples, surface angle P is greater than or equal to 110 degrees and less than or equal to 160 degrees. In another example, surface angle P is greater than or equal to 130 degrees and less than or equal to 140 degrees. In yet another example, surface angle P is equal to 135 degrees.

As depicted in FIG. 3A, rotor 30 and stator 32 are shown in a cold state whereby gas turbine engine 10 has a nonoperational steady state thermal condition. During operation, rotor 30, stator 32, as well as other components of gas turbine engine 10, heat up during operation. Differential thermal growth causes stator 32 to displace relative to rotor 30 as represented by FIG. 3B. Accordingly, radial gap RG and axial gap AG decrease between the cold state and the hot state of gas turbine engine 10. The extension distance C of stator flange 58 can be maximized for each rim seal 60 configuration to the extent permitted by the differential thermal growth, manufacturing tolerances, and/or assembly tolerances of rotor 30 and stator 32 to prevent contact between rotor 30 and stator 32 in the hot state.

In the depicted example, axial extents of rotor flange 46 and stator flange 58 may not overlap in the cold state of gas turbine engine 10. However, once thermal gradients of gas turbine engine 10 reach the hot state, stator flange 58 can axially overlap with rotor flange 46. In this overlapped condition, groove 62 can be disposed entirely downstream of rotor flange 46 such that upstream surface 62C coincides with or is downstream from end face 46C of rotor flange 46. In this condition, the axisymmetric profile of groove 62 produces recirculating flow FR radially inward from the main gas flow path 44 to thereby further restrict leakage flow into radial gap RG.

Discussion of Possible Embodiments

The following are non-exclusive descriptions of possible embodiments of the present invention.

Rim Seal Arrangement with a Flow Restrictor Groove

A rim seal arrangement for a gas turbine engine according to an example embodiment of this disclosure, among other possible things includes a rotor and a stator. The rotor includes a rotor disk adapted to rotate about a longitudinal axis and a plurality of rotor blades located radially outwardly of the rotor disk and being circumferentially spaced about the rotor disk. Each of the blades includes a rotor platform mounted to the rotor disk and an airfoil extending radially from the rotor platform to project with a main gas path of the gas turbine engine. The stator is disposed adjacent to and axially spaced apart from the rotor. The stator includes a plurality of vanes mounted to a stationary component of the gas turbine engine. Each vane comprises a stationary airfoil extending radially through the main gas path from an inner stator platform at a radially inner end of the vane. Each of the rotor platforms includes a rotor flange projecting axially toward the stator to form an annular rotor rim extending circumferentially around the longitudinal axis. Each of the inner stator platforms have a stator flange projecting axially toward the rotor disc to form an annular stator rim disposed radially inboard from the rotor rim. Each of the inner stator platforms project axially toward the rotor disk to define an annular section of the main gas path. Each stator flange comprises an outer surface, an end surface, a chamfer, and a groove. The outer surface faces radially outward relative to the longitudinal axis. The end surface is normal to the longitudinal axis. The chamfer bridges the outer surface and the end surface. The groove extends circumferentially along the outer surface. The groove comprises a base surface, a downstream surface, and an upstream surface. The base surface extends circumferentially about the longitudinal axis and is offset radially inward from the outer surface of the stator flange. The downstream surface extends radially inward from the gas path surface and obliquely to the longitudinal axis to define a transition between the gas path surface and the base surface. The upstream surface extends radially outward to join the base surface to the outer surface of the stator flange.

The rim seal arrangement of the preceding paragraph can optionally include, additionally and/or alternatively, any one or more of the following features, configurations and/or additional components.

A further embodiment of the foregoing rim seal arrangement, wherein an axial extent of the stator flange does not overlap with an axial extent of the rotor flange in a cold state.

A further embodiment of any of the foregoing rim seal arrangements, wherein the axial extent of the stator flange can overlap the axial extent of the rotor flange in a hot state.

A further embodiment of any of the foregoing rim seal arrangements, wherein the upstream surface of the groove does not overlap the rotor flange in the hot state.

A further embodiment of any of the foregoing rim seal arrangements, wherein the radial offset between the outer surface of the stator flange and the base surface of the groove can be at least three tenths a radial thickness of the stator flange measured between the outer surface and an inner surface of the stator flange.

A further embodiment of any of the foregoing rim seal arrangements, wherein the downstream surface of the groove can be frustoconical.

A further embodiment of any of the foregoing rim seal arrangements, wherein the downstream surface can extend an axial distance that is greater than an axial extent of the base surface.

A further embodiment of any of the foregoing rim seal arrangements, wherein the groove can comprise a radius joining the base surface to the upstream surface.

A further embodiment of any of the foregoing rim seal arrangements, wherein the radius can be at least half a radial offset distance between the outer surface and the base surface.

A further embodiment of any of the foregoing rim seal arrangements, wherein the upstream surface can be normal to the longitudinal axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rim seal arrangement for a gas turbine engine comprising:

a rotor having a rotor disk adapted to rotate about a longitudinal axis and a plurality of rotor blades located radially outwardly of the rotor disk and being circumferentially spaced about the rotor disk, each of the blades including a rotor platform mounted to the rotor disk and an airfoil extending radially from the rotor platform to project within a main gas path of the gas turbine engine; and a stator disposed adjacent to and axially spaced apart from the rotor, the stator including a plurality of vanes mounted to a stationary component of the gas turbine engine, each of the vanes comprising a stationary airfoil extending radially through the main gas path between an inner stator platform at a radially inner end of the vane;

each of the rotor platforms including a rotor flange projecting axially toward the stator to form an annular rotor rim extending circumferentially around the longitudinal axis;

each of the inner stator platforms having a stator flange projecting axially toward the rotor disk to form an annular stator rim disposed radially inboard of the rotor rim each of the inner stator platforms projecting axially toward the rotor disk to define an annular section of the main gas path;

each of the stator flange comprising:

an outer surface facing radially outward relative to the longitudinal axis;

an end surface normal to the longitudinal axis;

a chamfer bridging the outer surface and the end surface; and a groove extending circumferentially along the outer surface, the groove comprising:

a base surface extending circumferentially about the longitudinal axis and offset radially inward from the outer surface of the stator flange;

a downstream surface extending radially inward from the gas path surface and obliquely to the longitudinal axis to define a transition between the gas path surface and the base surface; and an upstream surface extending radially outward to join the base surface to the outer surface of the stator flange, and wherein an axial extent of the stator flange does not overlap with an axial extent of the rotor flange in a cold state.

2. The seal arrangement of claim 1, wherein the axial extent of the stator flange overlaps the axial extent of the rotor flange in a hot state, and wherein the upstream surface of the groove does not overlap the rotor flange in the hot state.

3. The seal arrangement of claim 1, wherein the radial offset between the outer surface of the stator flange and the base surface of the groove is at least three tenths a radial thickness of the stator flange measured between the outer surface and an inner surface of the stator flange.

4. The seal arrangement of claim 1, wherein the downstream surface of the groove is frustoconical.

5. The seal arrangement of claim 1, wherein the downstream surface extends an axial distance that is greater than an axial extent of the base surface.

6. The seal arrangement of claim 1, wherein the groove comprises a radius joining the base surface to the upstream surface, and wherein the radius is at least half a radial offset distance between the outer surface and the base surface.

7. The seal arrangement of claim 1, wherein the upstream surface is normal to the longitudinal axis.

8. A rim seal arrangement for a gas turbine engine comprising:

a rotor having a rotor disk adapted to rotate about a longitudinal axis and a plurality of rotor blades located radially outwardly of the rotor disk and being circumferentially spaced about the rotor disk, each of the blades including a rotor platform mounted to the rotor disk and an airfoil extending radially from the rotor platform to project within a main gas path of the gas turbine engine; and a stator disposed adjacent to and axially spaced apart from the rotor, the stator including a plurality of vanes mounted to a stationary component of the gas turbine engine, each of the vanes comprising a stationary airfoil extending radially through the main gas path between an inner stator platform at a radially inner end of the vane;

each of the rotor platforms including a rotor flange projecting axially toward the stator to form an annular rotor rim extending circumferentially around the longitudinal axis;

each of the inner stator platforms having a stator flange projecting axially toward the rotor disk to form an annular stator rim disposed radially inboard of the rotor rim each of the inner stator platforms projecting axially toward the rotor disk to define an annular section of the main gas path;

each of the stator flange comprising:

an outer surface facing radially outward relative to the longitudinal axis;

an end surface normal to the longitudinal axis;

a chamfer bridging the outer surface and the end surface; and a groove extending circumferentially along the outer surface, the groove comprising:

a base surface extending circumferentially about the longitudinal axis and offset radially inward from the outer surface of the stator flange;

a downstream surface extending radially inward from the gas path surface and obliquely to the longitudinal axis to define a frustoconical transition between the gas path surface and the base surface; and an upstream surface extending radially outward to join the base surface to the outer surface of the stator flange, wherein the upstream surface is normal to the longitudinal axis, and wherein an axial extent of the stator flange does not overlap with an axial extent of the rotor flange in a cold state.

9. The seal arrangement of claim 8, wherein the axial extent of the stator flange overlaps the axial extent of the rotor flange in a hot state, and wherein the upstream surface of the groove does not overlap the rotor flange in the hot state.

10. The seal arrangement of claim 8, wherein the radial offset between the outer surface of the stator flange and the base surface of the groove is at least three tenths a radial thickness of the stator flange measured between the outer surface and an inner surface of the stator flange.

11. The seal arrangement of claim 8, wherein the downstream surface extends an axial distance that is greater than an axial extent of the base surface.

12. The seal arrangement of claim 8, wherein the groove comprises a radius joining the base surface to the upstream surface, and wherein the radius is at least half a radial offset distance between the outer surface and the base surface.

* * * * *